US007436962B2

(12) United States Patent
Rodriguez et al.

(10) Patent No.: US 7,436,962 B2
(45) Date of Patent: Oct. 14, 2008

(54) METHOD AND APPARATUS FOR PROVIDING SECURED COMMUNICATION CONNECTIONS USING A SECURED COMMUNICATION CONNECTION OBJECT

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/465,271

(22) Filed: Jun. 19, 2003

(65) Prior Publication Data

US 2005/0018849 A1    Jan. 27, 2005

(51) Int. Cl.
*H04K 1/00* (2006.01)
*H04L 9/00* (2006.01)

(52) U.S. Cl. .................. 380/257; 713/150; 713/151; 713/152

(58) Field of Classification Search .......... 380/257; 379/201.11, 142.02, 142.04, 142.05, 142.06, 379/142.1, 201.09; 713/150–152
See application file for complete search history.

(56) References Cited

U.S. PATENT DOCUMENTS 5,657,390 A * 8/1997 Elgamal et al. ............. 713/151

| 6,631,125 | B1 * | 10/2003 | Longoni et al. ............. 370/341 |
| 7,020,256 | B2 * | 3/2006 | Jain et al. ............... 379/201.02 |
| 2003/0009694 | A1 * | 1/2003 | Wenocur et al. ............ 713/201 |
| 2004/0192252 | A1 * | 9/2004 | Aerrabotu et al. ........ 455/404.1 |
| 2004/0208301 | A1 * | 10/2004 | Urban et al. ........... 379/142.17 |

OTHER PUBLICATIONS

Microsoft Office XP Inside Out, 2001, Microsoft Press, pp. 1040-1043.*

* cited by examiner

*Primary Examiner*—Benjamin E Lanier
(74) *Attorney, Agent, or Firm*—Duke W. Yee; Matthew Talpis; Wayne P. Bailey

(57) ABSTRACT

An apparatus and method for establishing a communication connection between a first party and a second party using a secured communication connection object are provided. With the apparatus and method, a first party generates the secured communication connection object by setting parameters identifying and limiting the use of the secured communication connection object for establishing communication connections with the first party. These parameters are encapsulated with contact information for the first party such that the contact information is encrypted. The resulting secured communication connection object is then transmitted to a second party's communication device. When the second party wishes to establish a communication connection with the first party, the secured communication connection object is accessed in memory using information obtained from the object registry, the contact information is decrypted, and a communication unit is provided with the contact information for establishing a communication connection.

3 Claims, 8 Drawing Sheets

1. RECEIVE USER INPUT TO OBJECT CREATION USER INTERFACE MODULE
2. GENERATE SECURED TELEPHONE CONNECTION OBJECT BASED ON USER INPUT
3. STORE SECURED TELPHONE CONNECTION OBJECT
4. TRANSMIT SECURED TELEPHONE CONNECTION OBJECT TO RECIPIENT
5. STORE SECURED TELEPHONE CONNECTION OBJECT
6. UPDATE OBJECT REGISTRY BASED ON RECEIVED OBJECT
7. UPDATE DIRECTORY WITH ENTRY FOR RECEIVED OBJECT (CONTACT INFORMATION EXCLUDED)
8. UPDATE OBJECT USER INTERFACE BASED ON RECEIVED OBJECT
9. IN RESPONSE TO SELECTION TO ESTABLISH COMMUNICATION, RETRIEVE AND SEND OBJECT TO COMMUNICATION MODULE
10. USE OBJECT TO ESTABLISH COMMUNICATION CONNECTION WITH ORIGINATING DEVICE OF THE SECURED TELEPHONE CONNECTION OBJECT

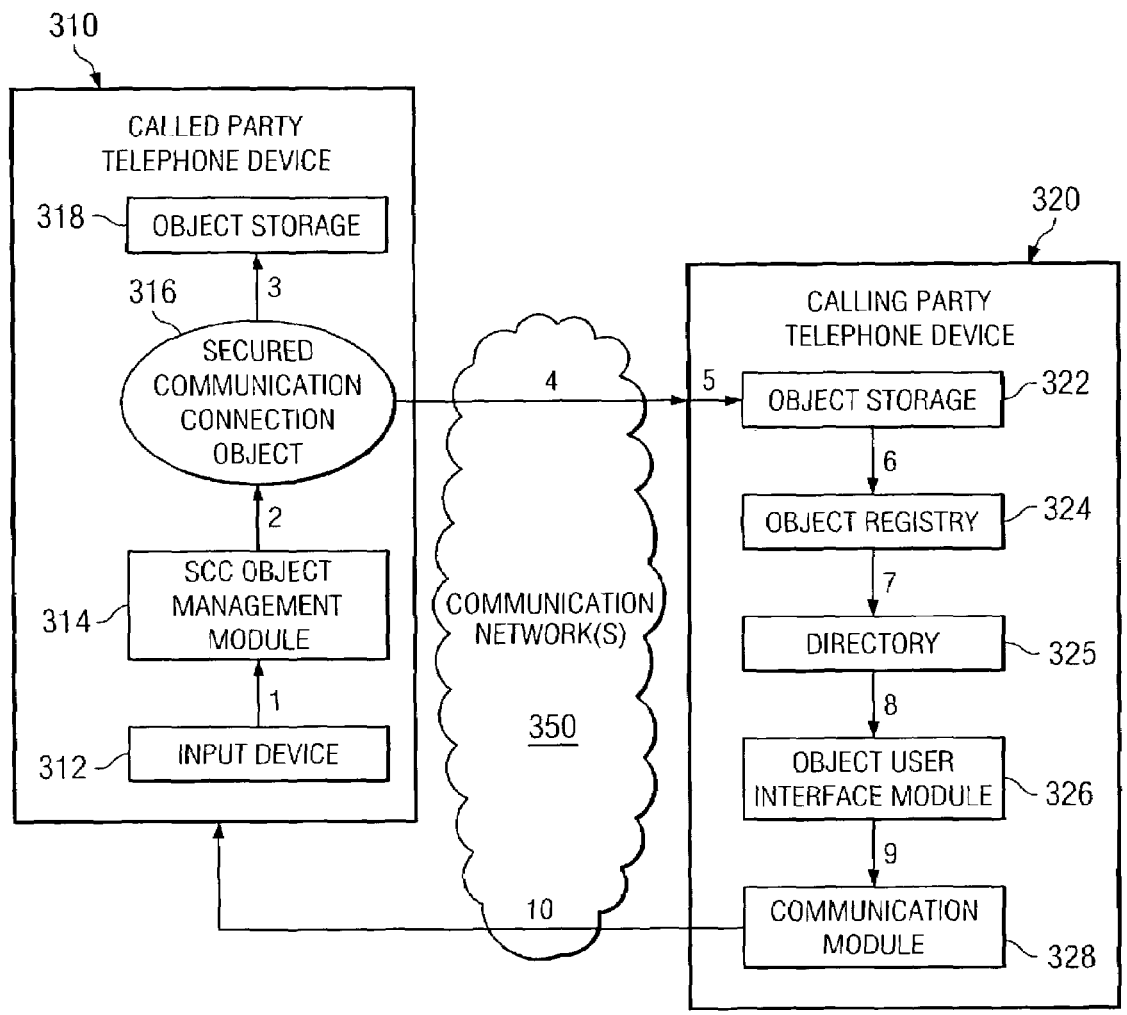

1. RECEIVE USER INPUT TO OBJECT CREATION USER INTERFACE MODULE
2. GENERATE SECURED TELEPHONE CONNECTION OBJECT BASED ON USER INPUT
3. STORE SECURED TELPHONE CONNECTION OBJECT
4. TRANSMIT SECURED TELEPHONE CONNECTION OBJECT TO RECIPIENT
5. STORE SECURED TELEPHONE CONNECTION OBJECT
6. UPDATE OBJECT REGISTRY BASED ON RECEIVED OBJECT
7. UPDATE DIRECTORY WITH ENTRY FOR RECEIVED OBJECT (CONTACT INFORMATION EXCLUDED)
8. UPDATE OBJECT USER INTERFACE BASED ON RECEIVED OBJECT
9. IN RESPONSE TO SELECTION TO ESTABLISH COMMUNICATION, RETRIEVE AND SEND OBJECT TO COMMUNICATION MODULE
10. USE OBJECT TO ESTABLISH COMMUNICATION CONNECTION WITH ORIGINATING DEVICE OF THE SECURED TELEPHONE CONNECTION OBJECT

*FIG. 3*

```
                                    1-1-3
    Enter Valid Time Range:
    Month:_
    Start Date:_
    End Date:_
    Start Time:_
    End Time:_
        455           450
          \          /
        Enter       Back
```
*FIG. 4E*

```
                                    1-1-4
    Enter Particular Time for
    Object Use:

Month:_
    Date:_
    Time:_
        455           450
          \          /
        Enter       Back
```
*FIG. 4F*

```
                                    1-1-4
    Enter Destination Number:

460           450
          \          /
        Transmit    Back
```
*FIG. 4G*

```
                                       1
    Name:

John Doe

Options      Back
```
*FIG. 5A*

METHOD AND APPARATUS FOR PROVIDING SECURED COMMUNICATION CONNECTIONS USING A SECURED COMMUNICATION CONNECTION OBJECT

BACKGROUND OF THE INVENTION

1. Technical Field

The present invention is directed to methods and apparatus for providing secured telephone connections using a secured telephone connection object. More specifically, the present invention is directed to mechanisms for providing an object for establishment of a communication connection with a creator of the object without informing a recipient of the object as to the telephone number of the creator of the object.

2. Description of Related Art

Many times circumstances arise where a telephone user wishes to have a caller contact the telephone user but would like to keep his or her telephone number private from the caller. This may be desired for privacy reasons to ensure that the user's telephone number remains private in the future, for example. The blocking of caller identification functionality is one example of the telephone service provider's attempt to maintain privacy of telephone numbers of calling parties. However, the blocking of caller identification functionality is performed while a calling party is attempting to establish a communication connection with a called party. The calling party must still know the called party's telephone number in order to attempt the telephone communication connection. Caller identification blocking does not allow a calling party to establish a communication connection without knowing the telephone number of the called party.

Thus, the problem exists with the current telephone technology requiring that the caller know the telephone number of the party that they wish to contact in order for a communication connection to be established. An exception to this requirement comes in the form of caller callback options in which a user may enter a particular code into their telephone unit in order for the last caller to be automatically called back.

For example, the code "*69" informs the public switch, to which the telephone unit is connected, to look up the telephone number of the calling party of the last call received by the public switch destined for the telephone unit. The public switch then attempts to establish a communication connection between the telephone unit and the previous calling party. During this operation, the user of the telephone unit is not informed of the telephone number of the calling party, unless the telephone unit is equipped with caller identification functionality and the calling party has not blocked the caller identification.

There are many problems associated with this approach. First, there is no guarantee that the called party will attempt a callback to the calling party. The called party may not know of the callback option or may not wish to pay the telephone service charges necessary to use the callback option. Second, if caller identification blocking is not used in conjunction with the callback option, then the called party may still be able to obtain the calling party's telephone number using their own caller identification equipment. Third, the callback option is limited to only the last call attempt received by the public switch and any prior call attempts cannot be called back using this functionality. This limits the time in which the called party may use the callback option to call a calling party. That is, if another call attempt directed to the telephone unit is received prior to the callback option being used, then it is not possible to perform a callback to the calling party of the previous call attempt.

Thus, it would be beneficial to have an apparatus and method for establishing telephone communication connections with a party without having to know the party's telephone numbers. Moreover, it would be beneficial to have an apparatus and method that allow a first party to request a second party to establish a communication connection with the first party without informing the second party of the contact address of the first party in a manner that is discernable to the second party. It would further be beneficial to have an apparatus and method for establishing a communication connection in which the party to which call charges are to be applied may be specified.

SUMMARY OF THE INVENTION

The present invention provides an apparatus and method for establishing a communication connection between a first party and a second party using a secured communication connection (SCC) object. With the apparatus and method of the present invention, a first party generates the secured communication connection object by setting parameters identifying and limiting the use of the secured communication connection object for establishing communication connections with the first party. These parameters are encapsulated with contact information for the first party such that the contact information is encrypted. The encryption may be in the form of public/private key encryption, hashtable based encryption, or any other known type of encryption.

The resulting secured communication connection object is then transmitted to a second party by the first party entering the contact information for the second party's communication device. At the second party's communication device, the object is received, stored, and an object registry is updated with identification information of the object. The object registry may include information regarding the use parameters associated with the secured communication connection object. This information may be accessible by the second party through one or more graphical user interfaces allowing the second party to know the use limitations of the secured communication connection object.

In addition, a stored directory or list of contacts may be updated to include an entry for the secured communication connection object. Such an entry may include, for example, an identifier of the first party but will exclude any of the encrypted contact information such that the second party may not be informed of the first party's contact information.

When the second party wishes to establish a communication connection with the first party, the second party may select the entry in the contacts directory or list using a user interface associated with the communication device. In response to selection of the entry in the contacts directory or list, the secured communication connection object is accessed in memory using information obtained from the object registry, the contact information is decrypted, and a communication unit is provided with the contact information for establishing a communication connection. In this way, the second party may initiate a communication connection with the first party, at any time within the use limits set forth in the parameters associated with the secured communication connection object, without ever knowing the contact information for the first party.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating the establishment of a communication connection between two communication devices using a secured communication connection object in accordance with one embodiment of the present invention;

FIGS. 4A-4G are exemplary diagrams illustrating graphical interfaces for creating a secured communication connection object in accordance with one embodiment of the present invention;

FIGS. 5A-5B are exemplary diagrams illustrating graphical interfaces for displaying a directory listing associated with a secured communication connection object in accordance with one embodiment of the present invention;

DETAILED DESCRIPTION OF THE PREFERRED EMBODIMENTS

The present invention provides a mechanism for establishing communication connections between parties without the initiator of the communication connection knowing the communication address of the party with which the communication connection is to be established. The present invention may be utilized to establish any communication connection type including a telephone communication connection, electronic mail communication connection, Internet telephony communication connection, video or audio stream communication connection, or the like, in which the privacy of the party with which the communication connection is to be established is to be preserved. For simplicity of the following description, however, it will be assumed in the following exemplary embodiments that the communication connection is a telephone communication connection. This in no way is intended to imply any limitation with regard to the types of communication connections that may be established using the mechanisms of the present invention.

Figure 1:
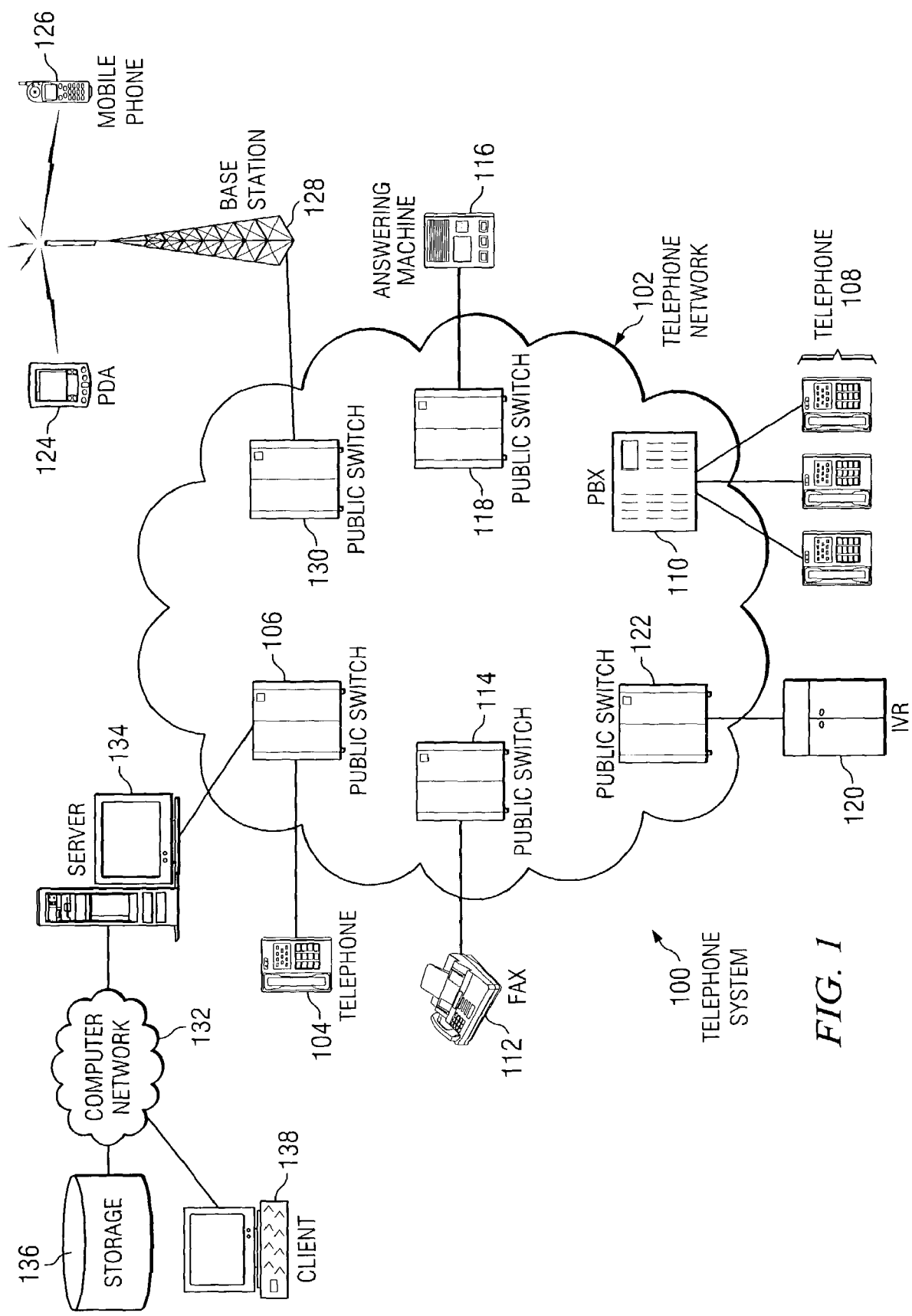
FIG. 1 is a pictorial representation of a telephone system in which the present invention may be implemented.

With reference now to the figures, FIG. 1 depicts a pictorial representation of a telephone system in which the present invention may be implemented Telephone system 100 is a network of telephone devices and/or computers in which the present invention may be implemented. Telephone system 100 contains a telephone network 102, which is the medium to provide telephonic communications between various telephone devices connected together in telephone system 100. Telephone network 102 may include connections, such as wired communication links, wireless communications links, satellite communication links, fiber optic cables, and the like.

In the depicted example, a telephone 104 is connected to telephone network 102 via public switch 106. A public switch is a large-scale computer system that is used to switch telephone calls, which are comprised of analog or digital data streams. Switches used to connect customers to the telephone networks are known as end office switches. End office switches may be connected together within a telephone network through tandem switches, which do not deal directly with the customers.

Telephones 108 are connected to the telephone network via public branch exchange (PBX) 110. A PBX is an in-house telephone switching system that interconnects telephone extensions to each other, as well as to an outside telephone network, such as telephone network 102. A PBX may include functions such as least cost routing for outside calls, call forwarding, conference calling and call accounting. Modern PBXs use all-digital methods for switching and may support both digital terminals and telephones, along with analog telephones. Telephones 108 may also be configured in a business environment with a voice mail system (not shown). PBX 110 may be connected to the telephone network by a public switch (not shown).

Fax machine 112 may be connected to the telephone network by public switch 114 and answering machine 116 may be connected to the telephone network by public switch 118. Furthermore, interactive voice response (IVR) system 120 may be connected to the telephone network by public switch 122. An IVR system is an automated telephone answering system that responds with a voice menu and allows the user to make choices and enter information via the keypad or spoken input. IVR systems are widely used in call centers as well as a replacement for human switchboard operators. The system may also integrate database access and fax response. IVR system 120 may be used to answer telephone calls at a store or business, provide business information, such as hours of operation and directions, and to direct calls to intended recipients or a voice mail system. Alternatively, IVR system 120 may be connected to the telephone network through a PBX, such as PBX 110.

Personal digital assistant (PDA) 124 and mobile telephone 126 may communicate with telephone network 102 using wireless technology. PDA 124 and mobile telephone 126 communicate with base station radio tower 128. The base station connects the caller with the telephone network through public switch 130. Base station 128 may cover a small geographic area referred to as a cell. A cellular telephone system includes many base stations, each covering a cell that only slightly overlaps adjacent cells at the borders. Therefore, the present invention may include many such base stations and public switches to serve a large geographic area if base station 128 is part of a cellular system. The PDA 124 and mobile telephone 126 may communicate with the base station 128 through various means, such as satellite communications, analog or digital cellular communications, radio frequency transmission, or the like.

A person of ordinary skill in the art will recognize that the configuration of telephone system 100 shown by example in FIG. 1 will vary depending upon implementation. For example, telephone system 100 may include any number of public switches and public branch exchanges connected to telephone network 102, each connected to any combination of telephones, answering machines, facsimile machines, IVR systems, a LAN and other telephone devices known in the art.

As previously mentioned above, the present invention provides an apparatus and method for establishing a communication connection between a first party and a second party using a secured communication connection object. With one exemplary embodiment of the present invention, communication devices, such as telephone 104, telephones 108, PDA 124, mobile telephone 126, or client device 138 are equipped with a secured communication connection object management system which allows for the creation of secured communication connection objects (hereafter referred to as SCC objects) and the use of such SCC objects to establish communication connections with other communication devices. For example, the mobile telephone 126 may be a third generation (3G) mobile telephone having programmability such that a secured communication connection object management application is provided therein. Similarly, telephone 104 may have a similar type of SCC object management system provided in software and/or hardware.

Alternatively, in other embodiments of the present invention, the functionality of the present invention for creating SCC objects and using them to create a communication connection with another communication device may be provided in a public switch, PBX, server or base station. In such embodiments, the actual SCC objects may be stored in the communication devices themselves with the SCC objects being provided to the public switch, PBX, server or base station when a communication connection is sought. Alternatively, the SCC objects may be stored in the public switch, PBX, server or base station themselves and may be accessible by communication devices via accessing the public switch, PBX, server or base station and inputting an appropriate identifier and, optionally a password, to gain access to the stored SCC objects.

Referring back to FIG. 1, assume that a user of mobile telephone 126 wishes to have a user of telephone 104 contact him/her. This may be, for example, in order to conduct a scheduled telephone conference, in response to a busy signal upon user of mobile telephone 126 attempting to call the user of telephone 104, in response to an answering machine answering a call from the mobile telephone 126, in order to have charges for the telephone call to be incurred by the user of telephone 104, or any other number of reasons why the user of mobile telephone 126 wishes for the user of telephone 104 to establish the call connection.

The user of the mobile telephone 126 initiates an operation to generate a secured communication connection object or retrieve a stored secured communication connection (SCC) object on the mobile telephone 126. This may be performed, for example, by selecting an appropriate menu option, pressing an appropriate key on a user interface of the mobile telephone 126, or the like. In the preferred embodiment, the mobile telephone 126 is equipped with the necessary software and hardware to perform the functions of generating the SCC object. However, in other embodiments, the initiation of the SCC object generation functionality of the present invention may cause a communication session with the base station 128 to be created in which the generation of the SCC object is performed by the base station 128 based on inputs received from the mobile telephone 126. The resulting SCC object may then be stored on the mobile telephone 126 and may be retrieved and transmitted to the intended recipient at telephone 104.

In either case, the initiation of the SCC object generation functionality of the present invention involves the user of the mobile telephone 126 selecting values for various SCC object attributes or parameters. Such attributes govern the time(s) and manner in which the resulting SCC object may be used, and what information is maintained in the SCC object, for example. The user of the mobile telephone 126 may be provided with one or more graphical interfaces through which the user may enter the values for these various attributes via a user interface associated with the mobile telephone 126. The user of the mobile telephone 126 may then enter a command to generate the SCC object based on the entered values of the attributes.

Once the command to generate the SCC object is received, the mechanism of the present invention encapsulates the attribute data entered by the user with other information retrieved from the memory of the mobile telephone 126. For example, the various values of the attributes may be included in the SCC object along with the telephone number of the mobile telephone 126, the name of the user of the mobile telephone 126, and one or more usage, billing and user interface methods associated with the SCC object.

The telephone number of the mobile telephone 126 may be encrypted prior to encapsulation in the SCC object in accordance with an encryption algorithm. Such encryption may include public key/private key encryption, hashtable based encryption, or any other known or later developed type of encryption. The telephone number is encrypted in order to prevent access to the telephone number by the user of the telephone 104 upon receipt of the SCC object.

The resulting SCC object is then transmitted to the telephone 104. The SCC object may be transmitted by the mobile telephone 126 to the telephone 104 by entry of the telephone number for telephone 104 and a command instructing the mobile telephone 126 to transmit the SCC object to the entered telephone number.

Such transmission of the SCC object may be performed over control channels of the telephone system and a voice channel between the mobile telephone 126 and the telephone 104 need not be established for the SCC object to be transmitted to and received by the telephone 104. Thus, the SCC object may be transmitted to the telephone 104 without causing the telephone 104 to ring. Furthermore, the user of the telephone 104 need not answer the telephone 104 in order for the SCC object to be received.

At the telephone 104, the SCC object is received by a SCC object management mechanism of the telephone 104. In response to receipt of the SCC object, the telephone 104 stores the SCC object and updates an object registry with identification information of the object. In addition, a notification may be provided via a display and/or audio output device of the telephone 104 indicating that a new SCC object has been received with a request that the user of telephone 104 contact the user of the mobile telephone 126 using the SCC object. This notification may further indicate the time and/or time range at which a call to the user of mobile telephone 126 should be made by the user of the telephone 104.

As mentioned above, upon receipt of the SCC object, an object registry may be updated to identify the newly received SCC object. The object registry may include information regarding the attributes associated with the SCC object. This information, or a portion of this information, may further be accessible by the user of the telephone 104 through one or more graphical user interfaces allowing the second party to know the use limitations of the SCC object.

In addition, a stored directory or list of contacts may be updated to include an entry for the SCC object. Such an entry may include, for example, an identifier of the user of mobile telephone 126 but will exclude the encrypted telephone number for mobile telephone 126 such that the user of telephone 104 may not be informed of the contact information for the user of mobile telephone 126. Furthermore, since the SCC object has usage limitations set forth in the attributes of the SCC object, these usage limitations may be used to cause the SCC object to expire after a predetermined number of uses, at a particular time, or the like, such that the SCC object is deleted without the user of the telephone 104 ever being able to know the telephone number of the mobile telephone 126. In this way, the privacy of the user's mobile telephone number is maintained while still providing the user of telephone 104 with an ability to establish a communication connection with the mobile telephone 126 within the usage limits of the SCC object.

When the user of telephone 104 wishes to establish a communication connection with the mobile telephone 126, the user of telephone 104 may select an entry corresponding to mobile telephone 126 in the contacts directory or list of telephone 104 using a user interface associated with the telephone 104. In response to selection of the entry in the contacts directory or list, the SCC object is accessed in memory using information obtained from the object registry. A check of the usage limitation attributes of the SCC object may then be performed to determine if a communication connection should be established using the SCC object.

If the establishment of a communication connection does not violate the usage limitations, the telephone number in the SCC object may be decrypted (but not revealed) and a communication unit of the telephone 104 may be provided with the telephone number for establishing a communication connection. In addition, a telephone service provider may be informed of billing information based on the SCC object to determine how and to whom the charges for the telephone communication are to be billed. In this way, the user of telephone 104 may initiate a telephone call to mobile telephone 126, at any time within the use limits set forth in the attributes associated with the SCC object, without the user of the telephone 104 ever knowing the telephone number for the mobile telephone 126.

Figure 2:
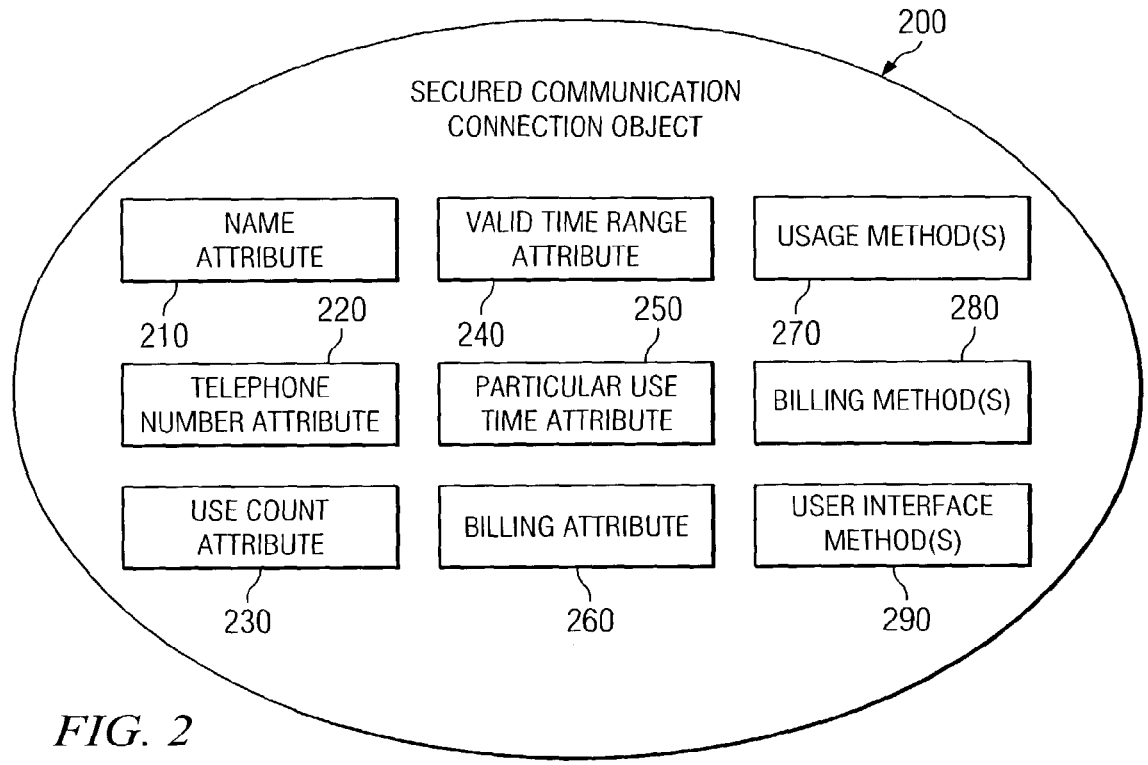
FIG. 2 is an exemplary block diagram of a secured communication connection object in accordance with one embodiment of the present invention.

FIG. 2 is an exemplary block diagram of a secured communication connection (SCC) object in accordance with one embodiment of the present invention. As shown in FIG. 2, the SCC object includes a plurality of attributes and a plurality of methods. The attributes and methods shown in FIG. 2 are only exemplary and are not intended to assert or imply any limitations with regard to the number or types of attributes and methods that may be included in an SCC object according to the present invention. Other attributes and methods may be used in conjunction with or in replacement of the attributes and methods illustrated in FIG. 2 without departing from the spirit and scope of the present invention.

As shown in FIG. 2, the SCC object 200 includes a name attribute 210, a telephone number attribute 220, a use count attribute 230, a valid time range attribute 240, a particular use time attribute 250 and a billing attribute 260. In addition, the SCC object 200 includes usage method(s) 270, billing method(s) 280, and user interface method(s) 290. Other attributes not explicitly shown in FIG. 2 may also be used without departing from the spirit and scope of the present invention. For example, an attribute identifying to whom the SCC object may be forwarded, whether the SCC object may be duplicated, an encrypted call forwarding telephone number indicating an alternate telephone number to use if a communication connection is not established with the telephone number in the telephone number attribute 220, and the like. The number of possible attributes that may be used with the SCC object are numerous and all of them cannot be described in detail here. However, these other attributes will be apparent to those of ordinary skill in the art in view of this disclosure and are intended to be within the scope of the present invention.

In a preferred embodiment, the SCC object 200 is a Java object that may be interpreted by a Java Virtual Machine (JVM) resident on a communication device, such as telephone 104 or mobile telephone 126 in FIG. 1. This is especially useful for communication devices that are third generation (3G) communication devices in which a Java Virtual Machine may be provided.

The name attribute 210 includes the name of the user that generated the SCC object. This name may be entered by the user or may be automatically obtained from configuration information stored in the telephone device, e.g., mobile telephone 126, or stored at the service provider upon creation of the SCC object 200. This name attribute 210 is used by the receiving telephone device, e.g., telephone 104, to update a directory listing or contact list so that the user of the telephone 104 may select an entry associated with the SCC object 200 in order to establish a communication connection with the mobile telephone 126.

The telephone number attribute 220 stores the telephone number that may be used to contact the originating communication device, e.g., mobile telephone 126, of the SCC object 200. The data associated with this attribute may be encrypted so that a recipient user of the SCC object 200 may not obtain access to the telephone number. However, the data associated with this attribute may be decrypted in order to establish a communication connection with the originator of the SCC object 200 without divulging the telephone number to the user of the recipient communication device.

The use count attribute 230 stores the number of times that the SCC object 200 may be used to establish a communication connection with the originating communication device. This attribute is decremented each time that the SCC object 200 is utilized to establish a communication connection with the originating communication device. Once the attribute has a value equal to 0, the SCC object 200 can no longer be used to establish communication connections with the originating communication device and may be deleted by an external process or the SCC object 200 may delete itself. The value of this attribute is initially set to a default value of 1.

The valid time range attribute 240 may store a time range in which the SCC object 200 may be utilized to establish communication connections with the originating communication device. This time range may include a date range and/or one or more time ranges including days of the week, hours and/or minutes during the day in which the SCC object 200 may be used. If an attempt to use the SCC object 200 is made outside one or more of these ranges, then the attempt will fail.

Moreover, if a particular date range has been exceeded, e.g., the date range is March 5-7 and the current date is March 8, then the SCC object 200 may be deleted from the recipient communication device via an external process or may delete itself. Alternatively, the SCC object 200 may allow the recipient of the SCC object 200 to archive a copy of the SCC object 200 however the archived copy of the SCC object 200 will not be able to be used to establish a communication connection. Whether or not to delete the SCC object 200, archive it, or perform some other clean-up operation may be determined based on the particular attributes associated with the SCC object 200.

The particular use time attribute 250 may be used to store a particular time when the SCC object 200 is to be used to establish a communication connection with the originating communication device. This attribute may be used, for example, to establish a communication connection for a scheduled telephone conference at a particular time by, for example, automatically dialing the encrypted telephone number associated with the SCC object 200. As long as the SCC object 200 is used within a predetermined tolerance of the time set in this attribute, the SCC object 200 may be used to establish a communication connection with the originating communication device. If the current time is beyond a threshold of the time set in this attribute, the SCC object 200 may be invalidated and may be deleted from the recipient communication device.

In addition, the particular use time attribute 250 may be used to update a calendar or appointment book application resident on the recipient communication device. That is, a telephone call may be scheduled in the calendar or appointment book with the name of the originating party, obtained from the party name attribute 210. In addition, an audible reminder tone may be output when the current time is within a particular threshold of the particular use time attribute 250.

The billing attribute 260 may store information used to determine whether the party using the SCC object or the party that originated the SCC object is to be billed for any communication connections established by the use of the SCC object 200. In other words, rather than the user of the telephone 104 being billed for the telephone service to establish a communication connection with the mobile telephone 126, the charges may be reversed such that the user of the mobile telephone 126 is billed for the call. This attribute may further include the actual account or billing information that is to be used to bill the calls established using the SCC object 200. In such a case, the billing attribute 260 may be encrypted for security purposes.

The usage method(s) 270 contain the functionality used to determine how the SCC object 200 may be used. Such methods include methods for determining if attempted uses of the SCC object meet the usage limitations set in the attributes 230-250. These methods may further include the functionality for decrypting the party telephone number attribute 220, establishing a communication connection using the telephone number attribute 220, and the like, making sure that the telephone number in the telephone number attribute 220 is never revealed to a user of the telephone, especially after decryption. Any necessary functionality for using the SCC object 200 to establish a communication connection may be included in the usage method(s) 270.

The billing method(s) 280 contain the functionality for billing charges incurred for establishing a communication connection using the SCC object 200. For example, these methods may include functionality for reversing the charges for calls established using the SCC object 200, specifying the number of minutes that the communication connection may remain active, and the like. In addition, the billing methods may designate the character string used to represent the called telephone number so that the actual telephone number is kept confidential on any subsequent bills generated by the telephone service provider. For example, rather than the bill indicating the telephone number used to establish the communication connection, a string of "#" sign characters, a message such as "number restricted", or an identifier of the SCC object used, may be designated in the billing methods such that the telephone service provider may indicate the charges for the call but does not reveal the telephone number used to establish the communication connection.

The user interface methods(s) 290 provide the functionality for updating and providing graphical user interfaces in the recipient communication device. Such graphical user interfaces may provide information regarding the attributes of the SCC object 200 and provide interfaces through which the SCC object 200 may be used to establish a communication connection with the originating communication device.

The values for the various attributes 210-260 may be input by a user of the originating communication device or may be automatically generated based on configuration information stored in the originating communication device or the telephone service provider's base station, server, PBX, public switch, or the like. The attributes 210-260 and methods 270-290 are encapsulated into the SCC object 200 and transmitted to the recipient communication device. The SCC object 200 may further be stored for multiple uses by the originating communication device.

FIG. 3 is an exemplary diagram illustrating the establishment of a communication connection between two communication devices using a secured communication connection object in accordance with one embodiment of the present invention. As shown in FIG. 3, in an originating communication device 310, input is received from a user via an input device 312 into an SCC object management application 314. The SCC object management application 314 generates an SCC object 316 based on the input received from the user. This SCC object 316 may be stored in the object storage 318 and may further be transmitted to a recipient communication device 320. The SCC object 316 may be transmitted to the recipient communication device 320 by entering a telephone number for the recipient communication device 320 into the SCC object management application 314 with a command to transmit the SCC object 316 to the recipient communication device 320 using the entered telephone number.

At the recipient communication device 320, the SCC object 316 is received and stored in an object storage 322. An object registry 324 is updated using the information stored in the SCC object 316 to include one or more entries for the SCC object 316. A directory or contact list 325 on the recipient communication device 320 is updated to include an entry for the SCC object 316. In addition, an object user interface module 326 is updated with user interfaces that may be used to access information regarding the SCC object 316.

The SCC object 316 may be utilized to establish a communication connection with the originating communication device 310 via the communication module 328. That is, the user of the recipient communication device 320 may select the entry in the directory or contact list 325 corresponding to the SCC object 316. In response to this selection, the object registry 324 is used to retrieve the SCC object 316 from the object storage 322. The telephone number attribute of the SCC object 316 may be decrypted and provided to the communication module 328 which then uses the telephone number to establish a communication connection with the originating communication device 310.

In an alternative embodiment, if the SCC object 316 includes a call forward telephone number attribute, such as the telephone number for a secretary or alternative telephone often used, the communication connection attempt may be repeated with this call forward telephone number in the event that the use of the primary telephone number in the SCC object 316 does not result in a communication connection being established. This call forward telephone number may be kept confidential in the same manner as discussed above with regard to the primary telephone number.

FIGS. 4A-4G are exemplary diagrams illustrating graphical interfaces for creating a secured communication connection object in accordance with one embodiment of the present invention. The exemplary graphical interfaces shown in FIGS. 4A-4G are for a mobile telephone, such as mobile telephone 126. Although the graphical interfaces shown in FIG. 4A-4G are for a mobile telephone, the present invention is not limited to such and the graphical interfaces are only intended to be exemplary.

Figure 4A:
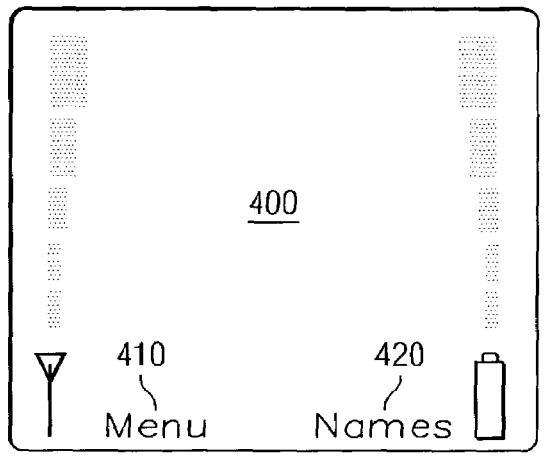

FIG. 4A is an exemplary diagram of a main user interface. As shown in FIG. 4A, the main user interface includes a "menu" option 410 and a "names" option 420. These options 410-420 may be selected by pressing an appropriate physical key of a keypad of the telephone that is assigned to these options. For example, in order to access the SCC object management system to generate an SCC object or to view the attributes of an SCC object, a user may operate the key on the keypad that activates the "menu" option 410. Alternatively, to view the directory or contact list associated with the mobile telephone, the user may operate a key on the keypad that activates the "names" option 420.

Figure 4B:
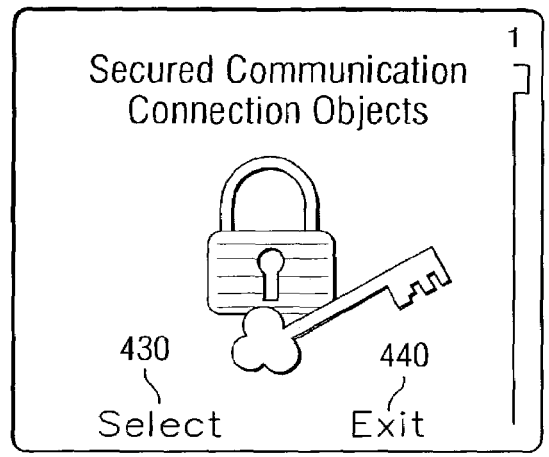

In response to selection of the "menu" option 410, subsequent menu options are shown on the display of the telephone for accessing options organized under the menu option 410. For example, as shown in FIG. 4B, an option under the menu option 410 may include a "secured communication connection objects" menu option, among others. As shown in FIG. 4B, the selectable options have changed to a "select" option 430 and an "exit" option 440. By choosing the "select" option 430, a user activates graphical interfaces for selecting whether to create an SCC object, view attributes of existing SCC objects, and the like. By selecting the "exit" option 440, the graphical interface returns to the main user interface shown in FIG. 4A.

Figure 4C:
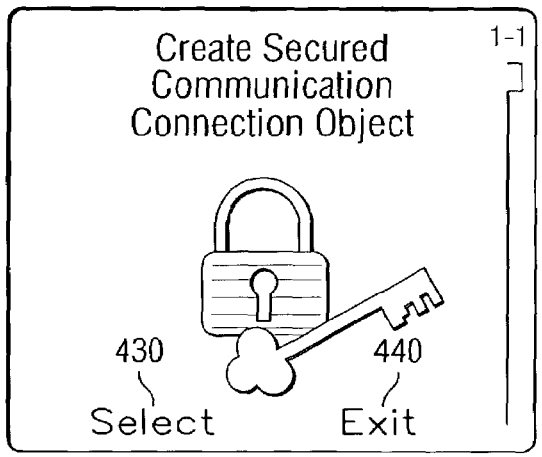

As shown in FIG. 4C, a first option displayed in response to choosing the "select" option 430 in FIG. 4B is the option to create an SCC object. Again, the selectable options of "select" 430 and "exit" 440 are provided so that a user may either select the displayed option or exit back to the graphical interface shown in FIG. 4B. A user may scroll through the available options by pressing a scroll key on the keypad of the telephone, as is generally known in the art.

Figure 4D:
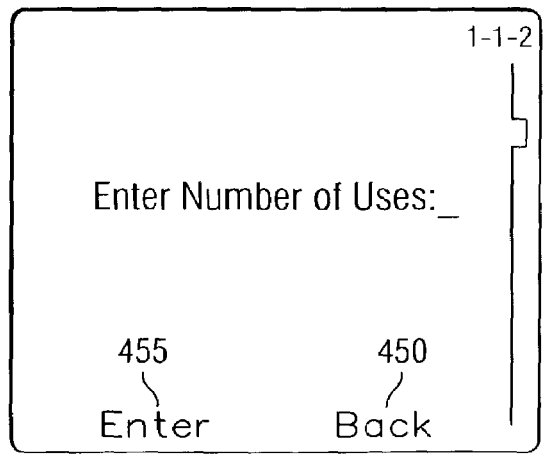

Upon selection of the create SCC object option in FIG. 4C, a plurality of graphical interfaces are provided for the user to enter values for attributes of the SCC object. Some of these graphical interfaces are shown in FIGS. 4C-4F. For example, FIG. 4D illustrates a graphical interface for entry of the number of uses for the SCC object. A user may enter the value for this attribute by pressing an appropriate key or series of keys on the keypad of the telephone. This graphical interface has a "back" option 450 and an "enter" option 455 for allowing a user to either input and submit the value for the number of uses, i.e. the "enter" option, or to return to the graphical interface of FIG. 4C.

FIG. 4E illustrates another graphical interface for entering valid time ranges for using the SCC object. These valid time ranges may include a month, start and end dates, and start and end times, for example. A user may enter the values for this attribute by pressing the appropriate key or keys on the keypad of the telephone with cursor keys being used to go from one entry field to another in the graphical interface. Again the "enter" and "back" options 450 and 455 are provided for entry of the values input via the graphical interface or returning to the graphical interface of FIG. 4D.

FIG. 4F illustrates another graphical interface for entering a particular use time attribute value. Similar to the other graphical interfaces, the values for this attribute are entered by pressing the appropriate key or keys on the keypad of the telephone with cursor keys being used to go from one entry field to another in the graphical interface. The "enter" option 455 may be used to enter the values for the attribute and the "back" option 450 may be used to return to the graphical interface in FIG. 4E.

FIG. 4G illustrates a graphical interface for entering a destination telephone number for an intended recipient of the SCC object. Using the keys on the keypad of the telephone, the user may enter the telephone number of the communication device to which the SCC object is to be sent. Alternatively, the user may scroll through the stored directory or contact list by pressing a cursor key on the keypad and then selecting an entry from the directory or contact list in order for the associated telephone number to be inserted into the entry field of the graphical interface shown in FIG. 4G. In addition, the user may establish and designate a distribution list to which the SCC object is to be sent. The generation of distribution lists is generally known in the art, however the use of a distribution list in association with the distribution of an SCC object has not be known prior to the present invention.

As shown in FIG. 4G, the selectable options have changed to a "transmit" option 460 and a "back" option 450. By selecting the "transmit" option 460, a user enters a command to encapsulate the attributes values of the SCC object along with other information, such as an encrypted form of the telephone number for the telephone, into an SCC object and transmit the SCC object to the recipient associated with the telephone number entered in the graphical interface of FIG. 4G. At this point the SCC object may also be stored in memory for use at a later time.

Figure 5B:
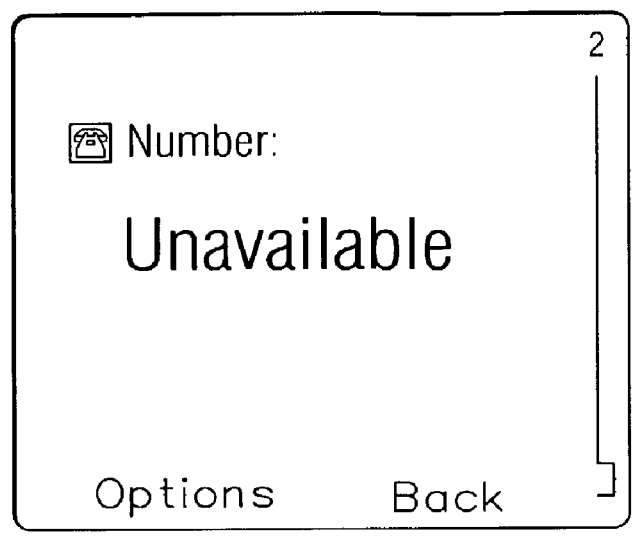

FIGS. 5A-5B are exemplary diagrams illustrating graphical interfaces, provided on a communication device associated with a recipient of the SCC object, for displaying a directory listing associated with a secured communication connection object in accordance with one embodiment of the present invention. As shown in FIG. 5A, the directory listing may include a first graphical interface in which the name associated with a directory listing entry may be displayed. For an SCC object, the name appearing in this graphical interface may be the name indicated in the name attribute of the SCC object.

As shown in FIG. 5B, the directory listing may further include a graphical interface for displaying the telephone number associated with the directory listing entry. For SCC objects, the telephone number will not be displayed and an "unavailable" or "restricted" message may be displayed in its place. This is because the SCC objects have the originating telephone number encrypted so that a user of a recipient communication device cannot gain access to the telephone number. The telephone number remains secret and is only decrypted when used to establish a communication connection with the originator of the SCC object. In this way, a telephone number for the telephone of a party that sent the SCC object remains private while still allowing the user of the SCC object to establish a communication connection with the party that sent the SCC object.

Figure 6:
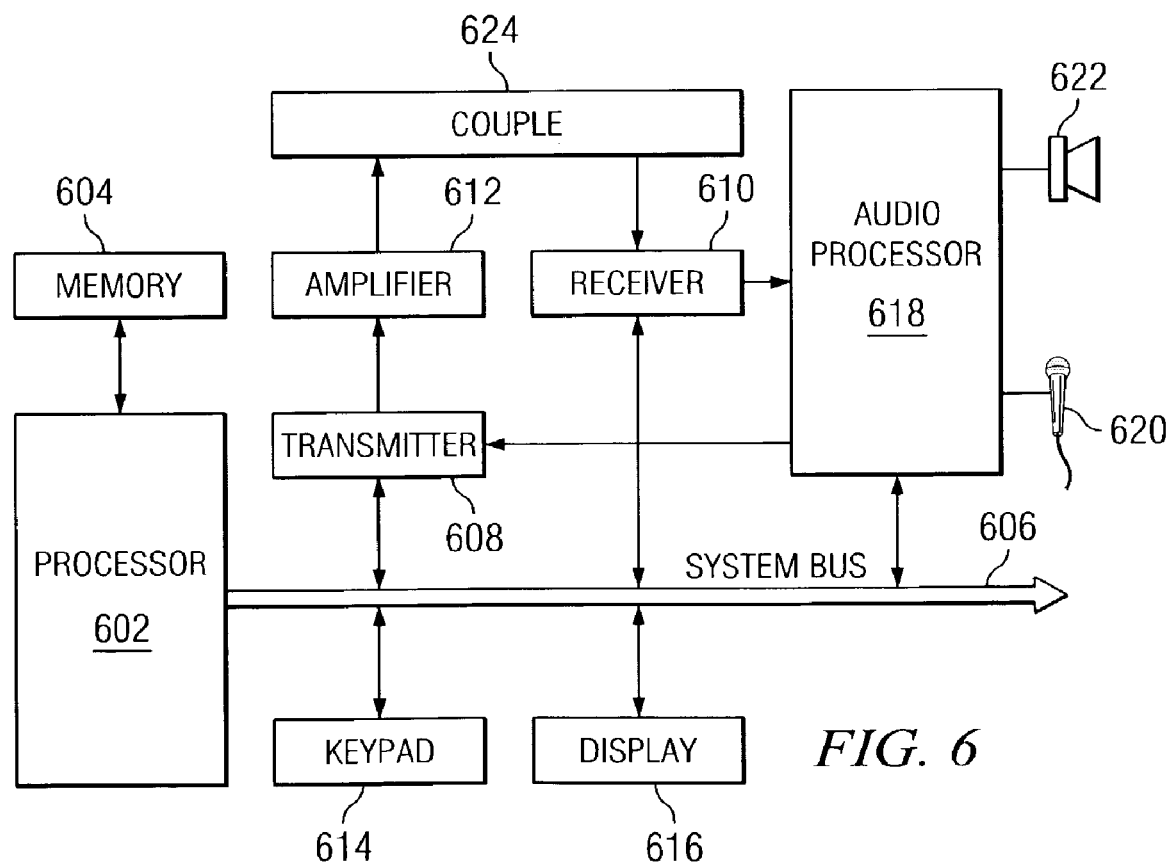
FIG. 6 is an exemplary block diagram illustrating a telephone communication device in accordance with one embodiment of the present invention.

With reference now to FIG. 6, a block diagram of a hardware configuration of a telephone device is depicted in accordance with a preferred embodiment of the present invention. Telephone device 600 includes a processor 602 for controlling operation of the telephone device and a memory 604. The processor 602 may be a general-purpose microprocessor operating under the control of instructions stored in a memory, such as memory 604, or device-specific circuitry for controlling the operation of the telephone device. Processor 602 is connected by system bus 606 to transmitter 608, receiver 610, keypad 614, display 616, and audio processor 618. Keypad 614 may be a physical keypad or a virtual keypad provided via a touch sensitive display and may include function buttons, pointing device controls, or other user interface peripheral elements commonly known in the art. Display 616 may include a liquid crystal display (LCD), plasma display, or other known type of display, such as a cathode ray tube, active matrix display, or the like.

Transmitter 608 and receiver 610 are coupled to a telephone signal by couple 624 to provide full duplex communication. The telephone signal may be provided by a telephone line (not shown) in a land-based telephone or an antenna in a wireless telephone. Audio processing circuit 618 provides basic analog audio outputs to speaker 620 and accepts analog audio inputs from microphone 622. Received signals are demodulated and decoded by receiver 610. Transmitter 608 encodes and modulates signals passed to it by processor 602 or audio processor 618. The output of the transmitter is amplified by power amplifier 612 to control the power level at which the signal is transmitted.

Those of ordinary skill in the art will appreciate that the hardware depicted in FIG. 6 is only exemplary and no limitation is intended or implied by the depiction in FIG. 6. Many modifications to the telephone device shown in FIG. 6 may be made without departing from the spirit and scope of the present invention.

With the present invention, processor 602 may perform the operations for generating SCC objects, including encrypting contact information, e.g., a telephone numbers, displaying graphical interfaces associated with generating the SCC objects, viewing attributes of SCC objects, using SCC objects to establish communication connections. The processor 602 may operate based on software instructions and data stored in memory 604. The processor 602 may further orchestrate the display of such interfaces via the display 616, may receive input from keypad 614, and may establish communication connections via the transmitter 608, amplifier 612 and couple 624. With regard to the mechanisms of the present invention, the processor 602 may operate in the manner previously described to generate, store, view and use SCC objects.

Figure 7:
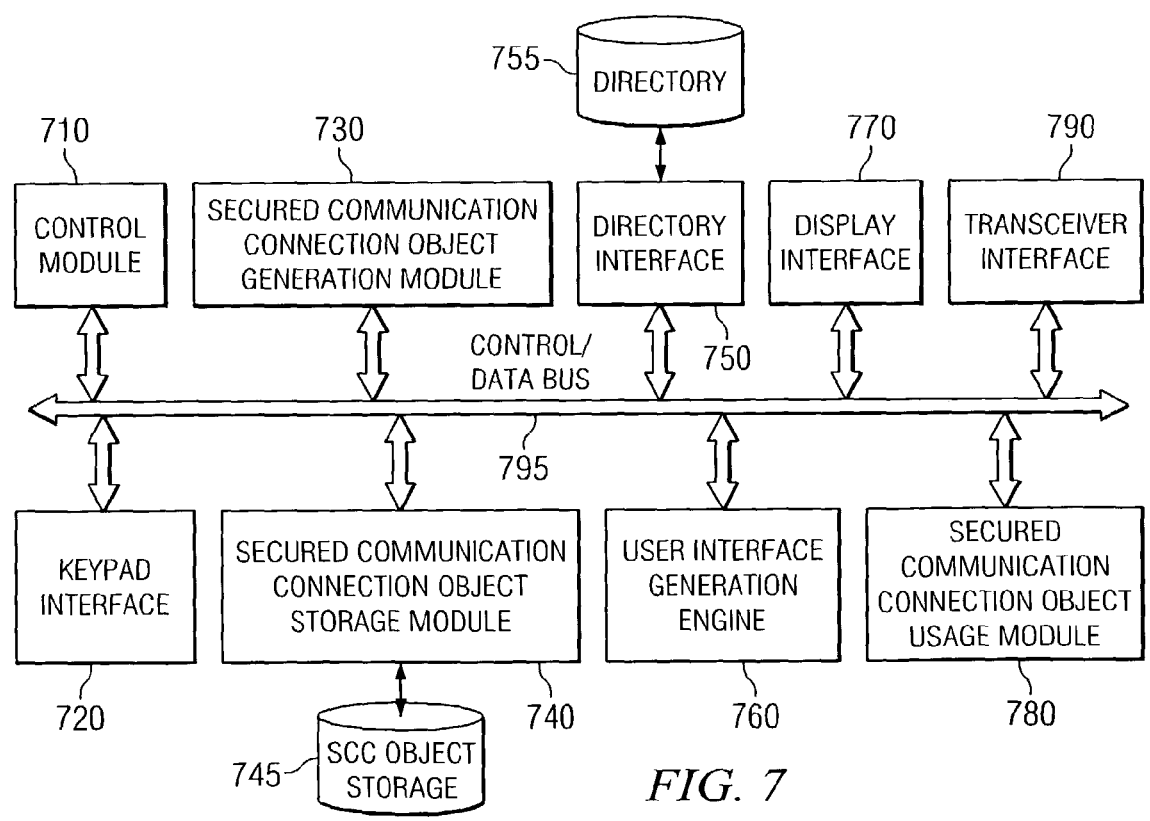
FIG. 7 is an exemplary block diagram illustrating the primary operational component of a communication device in accordance with the present invention.

FIG. 7 is an exemplary block diagram illustrating the primary operational components of an SCC object management system in a communication device in accordance with the present invention. The elements shown in FIG. 7 may be implemented in software, hardware, or any combination of software and hardware. In a preferred embodiment, the elements shown in FIG. 7 are implemented as software instructions executed by one or more processing devices.

As shown in FIG. 7, the SCC object management system includes a control module 710, a keypad interface 720, an SCC object generation module 730, an SCC object storage module 740, a directory interface 750, a user interface generation engine 760, a display interface 770, an SCC object usage module 780 and a transceiver interface 790. The elements 710-790 are in communication with one another via the control/data signal bus 795. Although a bus architecture is shown in FIG. 7, the present invention is not limited to such and any architecture that facilitates the communication of control/data signals between the elements 710-790 may be used without departing from the spirit and scope of the present invention.

The control module 710 controls the overall operation of the SCC object management system and orchestrates the operation of the other elements 720-790. The keypad interface 720 receives input from a keypad associated with the communication device and provides the input to the control module 710. The SCC object generation module 730 performs the functions previously described for collecting attribute value data and encapsulating the data with methods into an SCC object. The SCC object generation module 730 may interface with the SCC object storage module 740, the user interface generation engine 760 and the display interface 770 to provide graphical interfaces through which the user may enter attribute values which are received via the keypad interface 720 such that an SCC object is generated and stored in the SCC object storage 745.

The SCC object storage module 740 performs the necessary functions for storing an SCC object that is either created or received by the communication device, in the SCC object storage 745. The SCC object storage module 740 may further update an object registry for use in accessing the stored SCC objects in the SCC object storage 745.

The directory interface 750 performs the functions necessary for updating and accessing the directory 755. As previously mentioned, these functions may include updating the directory 755 to include an entry for a received SCC object in which the directory entry includes an identifier of the name of the party that sent the SCC object but having the contact number not displayed, i.e. unavailable.

The user interface generation engine 760 generates the graphical interfaces for display by the display device via the display interface 770. These graphical interfaces provide menu options, graphical interfaces for entry of attribute value data, graphical interfaces for displaying directory listings, graphical interfaces for displaying attributes of the SCC objects, graphical interfaces for establishing a communication connection using an SCC object, and the like.

The SCC object usage module 780 performs the functions for determining if an attempted use of an SCC object is valid in view of the limitations associated with the SCC object. In addition, the SCC object usage module may handle billing of charges for the call made using an SCC object based on billing attributes of the SCC object. The SCC object usage module 780 may further work with the transceiver interface 790 to set up and establish a communication connection using the SCC object. This may involve decrypting telephone number information in the SCC object if the SCC object usage module 780 determines that the attempt to use the SCC object is valid within the limitations of the SCC object. The SCC object usage module 780 may perform additional functions associated with the use of an SCC object not specifically set forth here.

Thus, the present invention provides a mechanism for generating an object that may be used to establish a communication connection with an originator of the object without having to know the telephone number contact information for the originator of the object. With the present invention, a user may send an SCC object to another party with a request that the party contact the user using the SCC object. The SCC object may then be used by the party to establish a communication connection without the party ever knowing the telephone number or contact information of the originating user. In this way, the privacy of the user's contact information is maintained while allowing for the communication connection to be established.

Figure 8:
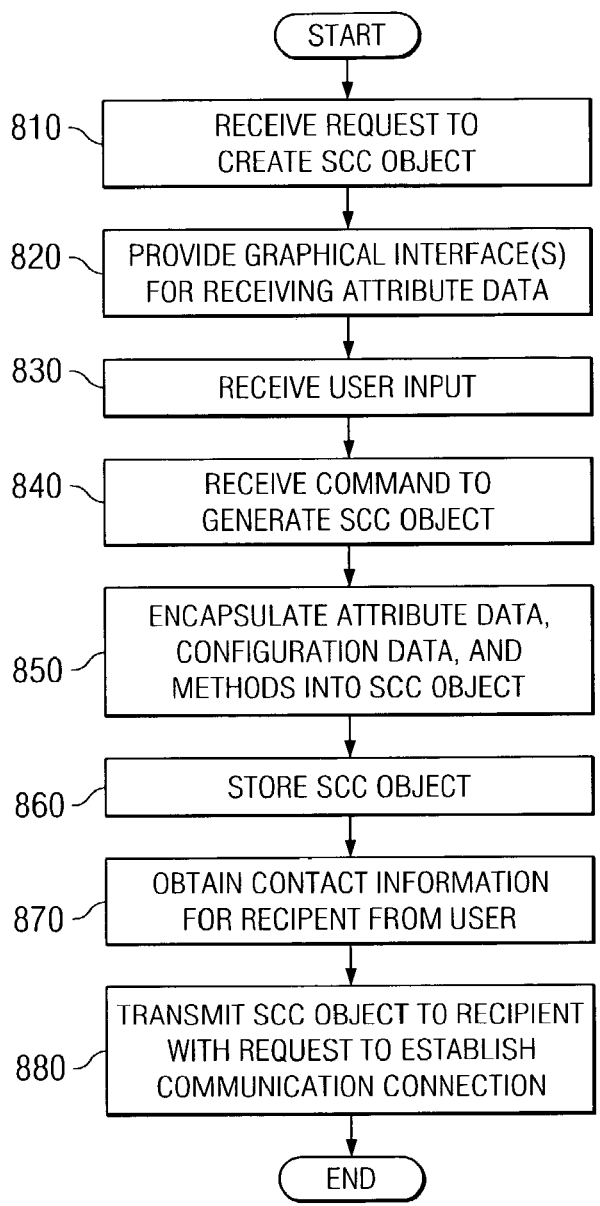
FIG. 8 is a flowchart outlining an exemplary operation for creating a secured communication connection object in accordance with one embodiment of the present invention.
Figure 9:
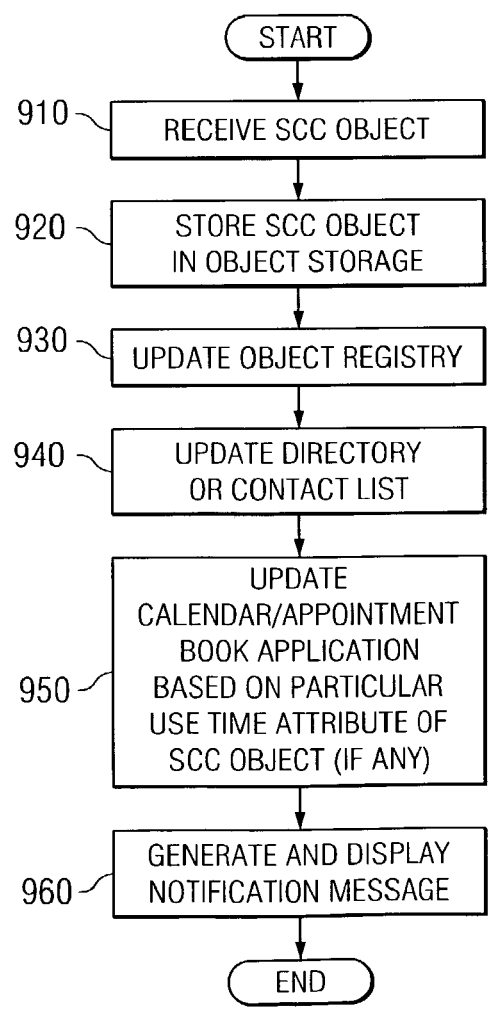
FIG. 9 is a flowchart outlining an exemplary operation of a communication device when receiving an SCC object from another communication device in accordance with the present invention.
Figure 10:
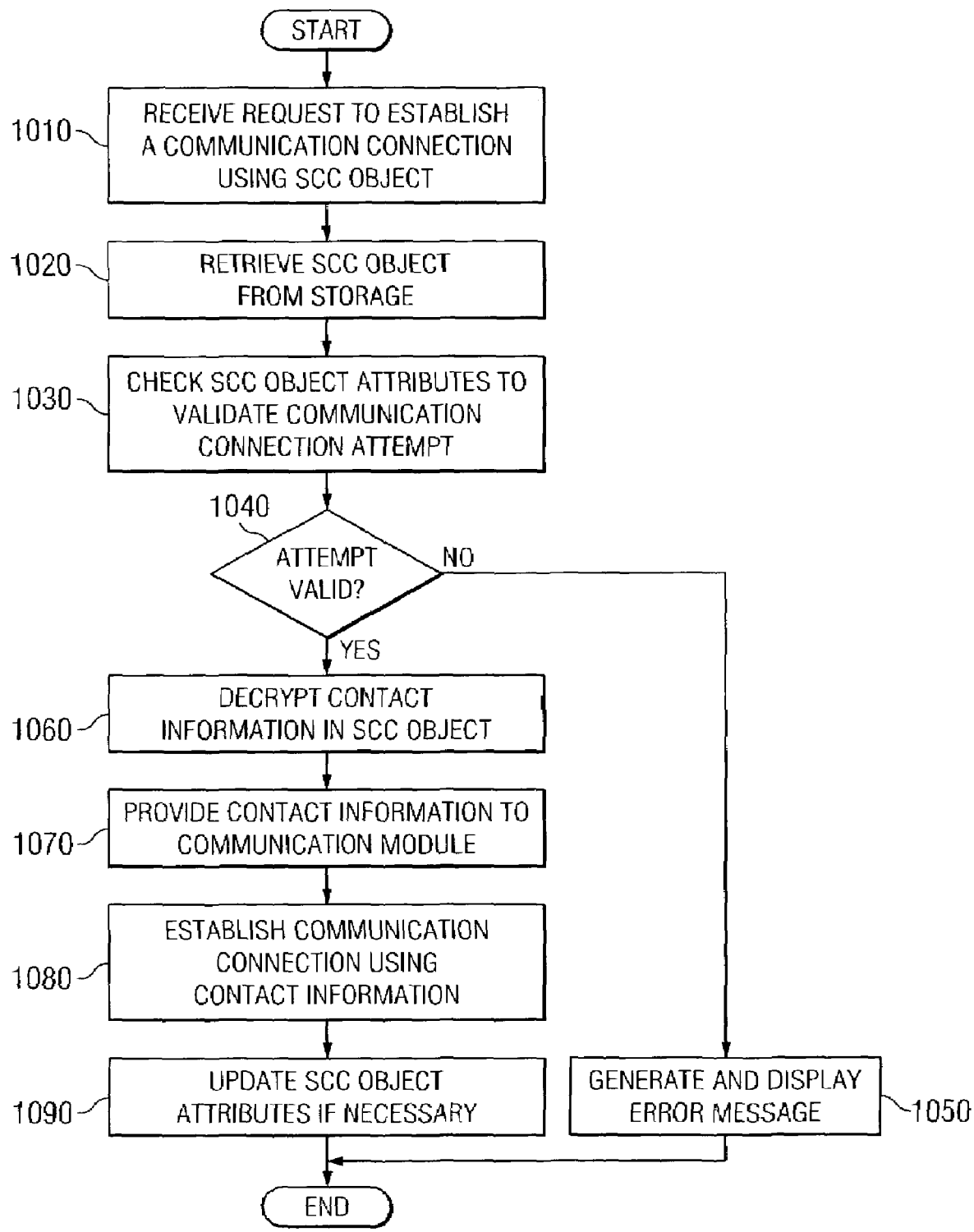
FIG. 10 is a flowchart outlining an exemplary operation for establishing a communication connection using a secured communication connection object in accordance with the present invention.

FIGS. 8-10 are flowcharts that illustrate the creation of a secured communication connection object and the use of the secured communication connection object to establish a communication connection, respectively, in accordance with exemplary embodiments of the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 8 is a flowchart outlining an exemplary operation, in an originating communication device, for creating a secured communication connection object in accordance with one embodiment of the present invention. As shown in FIG. 8, the operation starts by receiving a request to create an SCC object (step 810). One or more graphical interfaces are provided for receiving user input regarding values for SCC object attributes (step 820). The user input to the graphical interfaces is received (step 830) and a command is received to generate the SCC object (step 840). The attribute data, data obtained from configuration information stored in the communication device, and methods for using the SCC object are encapsulated into an SCC object (step 850). The SCC object is then stored in an object storage (step 860). Contact information for the intended recipient of the SCC object is then obtained from the user (step 870) and the SCC object is transmitted to the intended recipient using this contact information (step 880). The operation then ends.

FIG. 9 is a flowchart outlining an exemplary operation of a recipient communication device when receiving an SCC object from an originating communication device in accordance with the present invention. As shown in FIG. 9, the operation starts with receipt of the SCC object (step 910). The SCC object is stored in an object storage (step 920) and information from the SCC object is used to update an object registry (step 930) and a directory or contact list (step 940). If the communication device is equipped with a calendar application or appointment book application, the application is updated with any particular time usage information from the SCC object with an optional audible alarm option enabled (step 950). A message may then be generated for display on the communication device's display indicating receipt of the SCC object and the party name associated with the SCC object (step 960). Such a message may take the form "A request has been received for you to contact Steve, and a directory listing for Steve has been added." The operation then ends.

FIG. 10 is a flowchart outlining an exemplary operation, in a recipient communication device in which an SCC object has been received and stored, for establishing a communication connection using a secured communication connection object in accordance with the present invention. As shown in FIG. 10, the operation starts with a request being received from a user to establish a communication connection with another party using an SCC object (step 1010). Such a request may take the form of a user selecting a directory entry corresponding to the SCC object and a command to establish a communication connection with the communication device of the party associated with the SCC object. Thereafter, the SCC object is retrieved from memory using the object registry information (step 1020). A check of the SCC object attributes is made to determine if the attempted use of the SCC object is valid (step 1030). This may involve determining if there is a remaining number of uses left for the SCC object, checking to make sure the current time falls within a range of time that the SCC object may be used, checking to make sure that the current time is within a threshold of a particular use time attribute of the SCC object, and the like.

A determination is made as to whether the attempted use is a valid use (step 1040). If not, the operation terminates with an error message being provided (step 1050). Otherwise, the contact information of the SCC object is decrypted (step 1060) and provided to the communication module of the communication device (step 1070). The communication module then establishes a communication connection in a normal manner using the contact information obtained from the SCC object (step 1080). The SCC object attributes may then be updated as necessary, i.e. the number of uses left count may be decremented, or the SCC object may be deleted depending on the particular attributes of the SCC object (step 1090). The operation then terminates.

It should be noted that at no time during this process is the contact information made available to the user of the recipient communication device. In this way, the SCC object may be used to establish a communication connection and may keep the contact information secret.

Thus, the present invention provides a security mechanism that allows a user of a first communication device to provide a second communication device with an ability to contact the first communication device without divulging the contact information for the first communication device to a user of the second communication device. In this way, the user of the second communication device may call the user of the first communication device and yet never know the telephone number of the user of the first communication device.

While the present invention has been described in terms of telephone communication devices, as previously mentioned, the present invention is not limited to such. The principles and mechanisms of the present invention may be used to provide security and privacy in other forms of communication including electronic mail messages, audio and video streaming, and the like. For example, with electronic mail messages, an SCC object may be created for sending to a recipient computer with the encrypted contact information being the electronic mail address of the originator of the SCC object. In this way, the recipient may send an electronic mail message to the originator of the SCC object without knowing the electronic mail address of the originator of the SCC object. Similarly, video and audio streams may be requested by sending an SCC object that allows the computer system to send the video and audio streams without informing a user of the IP address to which the video and audio streams are being sent.

In addition, while the present invention has been described primarily as having the functions of the present invention being performed in the communication devices themselves, as previously mentioned, the present invention may be implemented entirely within one or more computing devices separate from the communication devices, e.g., a server, base station, public branch exchange, public switch, or the like. In such as case, the originator of an SCC object may log onto the computing device through a data communication, through a voice response system, or the like, and access the functions of the present invention to create and distribute the SCC object.

The SCC object may not actually be distributed to the recipient communication devices and may remain in data storage at the computing device. In such a case, the recipient communication device may be provided with an indication that the SCC object may be used by the recipient communication device to contact the originator of the SCC object and how to access the SCC object. The recipient communication device would then need to log onto the computing device and access the SCC object in the data storage of the computing device in order for the SCC object to be used to establish the communication connection. In this way, the SCC object is never actually sent to the communication devices and all of the functionality of the present invention is performed in the computing device that is separate from the communication devices.

It is important to note that while the present invention has been described in the context of a fully functioning data processing system, those of ordinary skill in the art will appreciate that the processes of the present invention are capable of being distributed in the form of a computer readable medium of instructions of a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of establishing a communication connection between a first communication device and a second communication device in a communication network, comprising:
    generating, by the first communication device, an object having contact information encrypted therein;
    transmitting the object to the second communication device; and
    using, by the second communication device, the contact information of the object to establish a communication connection between the second communication device and the first communication device, wherein the contact information is not accessible by a user of the second communication device through a graphical user interface of the second communication device, and wherein the object further includes at least one billing attribute identifying how and to whom charges for communication connections established using the object are to be billed, wherein the at least one billing attribute further includes an identifier of the contact information that is used in place of the contact information on a subsequent generated bill.

2. A computer program product in a computer recordable medium for establishing a communication connection between a first communication device and a second communication device in a communication network, comprising:
    first instructions for generating, by the first communication device, an object having contact information encrypted therein;
    second instructions for transmitting the object to the second communication device; and
    third instructions for using, by the second communication device, the contact information of the object to establish a communication connection between the second communication device and the first communication device, wherein the contact information is not accessible by a user of the second communication device through a graphical user interface of the second communication device, and wherein the object further includes at least one billing attribute identifying how and to whom charges for communication connections established using the object are to be billed, wherein the at least one billing attribute further includes an identifier of the contact information that is used in place of the contact information on a subsequent generated bill.

3. A hardware-based system for establishing a communication connection between a first communication device having a processor and a second communication device in a communication network, comprising:
    means for generating, by the first communication device, an object having contact information encrypted therein;
    means for transmitting the object to the second communication device; and
    means for using, by the second communication device, the contact information of the object to establish a communication connection between the second communication device and the first communication device, wherein the contact information is not accessible by a user of the second communication device through a graphical user interface of the second communication device, and wherein the object further includes at least one billing attribute identifying how and to whom charges for communication connections established using the object are to be billed, wherein the at least one billing attribute further includes an identifier of the contact information that is used in place of the contact information on a subsequent generated bill.

* * * * *